United States Patent [19]
Rothe

[11] Patent Number: 5,014,289
[45] Date of Patent: May 7, 1991

[54] LONG LIFE ELECTRODES FOR LARGE-AREA X-RAY GENERATORS

[75] Inventor: Dietmar E. Rothe, Cardiff, Calif.

[73] Assignee: Lasertechnics, Inc., Albuquerque, N. Mex.

[21] Appl. No.: 316,475

[22] Filed: Feb. 27, 1989

[51] Int. Cl.$^5$ .............................................. H01J 35/04
[52] U.S. Cl. .................................... 378/122; 378/119; 378/136; 378/143
[58] Field of Search ........ 378/119, 121, 122, 136–138, 378/143

[56] References Cited

U.S. PATENT DOCUMENTS

| | | | |
|---|---|---|---|
| 4,012,656 | 3/1977 | Norman et al. | 378/122 |
| 4,670,894 | 6/1987 | Birnbach et al. | 378/122 |
| 4,757,524 | 7/1988 | Laul | 378/122 |

OTHER PUBLICATIONS

J. I. Levatter and S. C. Lin, "Necessary Conditions for the Homogeneous Formation of Pulsed Avalanche Discharges at High Gas Pressures," J. Appl. Phys. 51 (1980), 210.
S. J. Scott, "Experimental Investigations on an X-ray Preionizer Test Bed," J. Appl. Phys. 64 (1988), 537.
G. Wakaloupulos, "High Peak Power Pulsed WIP Electron Gun," Final Report, Contract No. 78-7-3-09176/E1377-002, Lawrence Livermore Radiation Lab., Livermore, Calif. (Oct. 1978).
J. I. Levatter, R. L. Sandstrom, and J. H. Morris, "The Corona Plasma Cathode: A New Long-Life E-Beam Cathode for X-ray Preionization," Proc. IEEE, 4th Pulsed Power Conf., 1983, ed. T. K. Martin, M. F. Rose (N.Y. 1983).

Primary Examiner—Carolyn E. Fields
Assistant Examiner—David P. Porta
Attorney, Agent, or Firm—William E. Hein

[57] ABSTRACT

This invention is directed to rugged, reliable, and long-life electrodes for use in large-area, high-current-density electron gun and x-ray generators which are employed as contamination-free preionizers for high-energy pulsed gas lasers. The electron source at the cathode is a corona plasma formed at the interface between a conductor, or semiconductor, and a high-permittivity dielectric. Detailed descriptions are provided of a reliable cold plasma cathode, as well as an efficient liquid-cooled electron beam target (anode) and x-ray generator which concentrates the x-ray flux in the direction of an x-ray window.

22 Claims, 5 Drawing Sheets

LONG LIFE ELECTRODES FOR LARGE-AREA X-RAY GENERATORS

ORIGIN OF THE INVENTION

This invention was made with United States Government support under NASA Contract NAS 7-970 awarded by the National Aeronautics and Space Administration. The United States Government has certain rights in this invention.

BACKGROUND OF THE INVENTION

This invention relates generally to wide-area cold cathode electron guns and x-ray generators and more specifically to electrodes therefor that utilize a corona plasma for liberating electrons. Commercial x-ray generators used in medical applications, materials testing, airport security, etc. are high-vacuum electron tubes with thermionic cathodes, producing electron beam pulses of tens of microseconds duration and having current densities of a few mA/cm$^2$. The electron beam (e-beam) is focused on a small, high-Z target area on the anode, which emits the x-rays.

New applications for electron beam and x-ray pulses in the field of high energy lasers require space-charge limited e-beam current densities in the range of 1 to 10 A/cm$^2$, short pulses of less than 1 microsecond duration L and high intensity irradiation over wide areas on the order of 10$^2$ to 10$^4$ cm$^2$. A number of cold cathode guns have been developed to fill this need. However, most of these guns suffer from a short cathode life, typically limited to 10$^3$ to 10$^7$ pulses.

Electrically pulsed, self-sustained discharge-excited, high-energy gas lasers, such as XeCl, XeF, KrF, C0$_2$, and HgBr lasers, require uniform preionization of the high pressure gas mixture for discharge uniformity and stability. Generally, an ionization level of at least 10$^6$ electrons/cm$^3$ is necessary during the avalanche discharge formation process to prevent the electron avalanche from developing into a set of narrow streamers or arcs. See A. J. Palmer, Appl. Phys Lett. 25 (1974) 138 and J. I. Levatter and S. C. Lin, "Necessary Conditions for the Homogeneous Formation of Pulsed Avalanche Discharges at High Gas Pressures", J. Appl. Phys. 51 (1980) 210. For optimal laser efficiency and laser beam uniformity, the preionization level should be between 10$^8$ and 10$^9$ electrons per cm$^3$. Pre-ionization uniformity should be within plus or minus twenty percent throughout the discharge volume. Hence, x-ray flux uniformity should also be within plus or minus twenty percent.

Ultraviolet (UV) light from spark arrays, located near the discharge electrodes, is presently utilized in most commercial high-pressure gas lasers to ionize the discharge volume. It is well known, however, that x-ray preionization is superior to the more conventional UV-preionization when the gas laser has a large discharge volume, operates at a high pressure, or is required to have a long gas life and system life of more than 10$^8$ shots. Under these circumstances, the advantages of x-rays over UV-radiation justify the higher cost of the x-ray generator.

X-ray preionization offers the following advantages: (1) X-rays can preionize large volumes uniformly; (2) The x-ray generator is physically separated from the laser gas, which in many cases is corrosive; (3) The x-ray source does not contaminate the laser as UV sparks do; and (4) The x-ray flux can be collimated or vignetted and passed through one of the discharge electrodes (e.g. a 3 mm thick aluminum window). The x-rays can thus be used to define the discharge dimensions by spatially selective preionization.

Electron guns that are presently available for generating the x-ray pulse differ primarily in the manner in which electrons are liberated in sufficient quantity at the cathode. Hot cathodes, such as thoriated tungsten and dispenser cathodes, require hard vacuum and large heater power. Thermionically limited emitters are limited to a current density of less than 100 mA/cm$^2$. Cold field-emission cathodes, such as sharp blades, needles, and carbon felt, are simple and rugged, but exhibit very non-uniform emission characteristics after 10$^6$ pulses, and occasionally after only 10$^3$ pulses. A carbon felt cathode design with a control grid has recently been patented by Birnbach et al. as U.S. Pat. No. 4,670,894 issued June 2, 1987. Such a cathode, however, is not suitable for pulse repetition rates above a few hertz. See S. J. Scott, "Experimental Investigations on an X-ray Preionizer Test Bed," J. Appl. Phys. 64 (1988) 537.

Only so-called plasma cathode guns have demonstrated lifetimes in excess of 10$^8$ pulses, when operated in the short pulse (less than 1 microsecond) and high current density (greater than 1 A/cm$^2$) regime. With proper anode cooling, plasma cathode guns can also be operated at high pulse repetition rates of more than 100 Hz.

A grid controlled plasma gun which liberates electrons from the cathode by secondary electron emission due to positive ion bombardment is known as the "Wire Ion Plasma" or WIP gun. See G. Wakalopulos, "High Peak Power Pulsed WIP Electron Gun," Final Report, Contract No. 78-73-09176/E1377-002 Lawrence Livermore Radiation Lab., Livermore, Calif. (October, 1978). It can be built quite rugged, and can operate at pulse rates above 10 KHz. Its major drawbacks are high complexity, high cost, slow current rise, and the need for accurate control of the background gas pressure.

A surface-spark-cathode gun has recently been developed and marketed by Beta Development Corp., Dublin, Calif. The electron source is a spark plasma created by a series of surface discharges initiated by a 10 kV pulse. The electrons are then accelerated toward an anode maintained at 70 kV to 100 kV DC. Because of the small amount of energy (approximately 1 mJ) switched into the sparks, this cathode has a surprisingly long life of approximately 10$^7$ pulses. Disadvantages of this gun are a relatively short cathode life of less than 10$^8$ pulses and a large (30 cm diameter) gun chamber to accommodate the high DC voltage on the anode.

In 1982, a corona plasma cathode was developed by Helionetics, Inc. (HLX Laser), which cathode consisted of a tungsten wire coil wound around a glass tube. European Patent Application No. 0101043 filed Aug. 8, 1983; and J. I. Levatter, R. L. Sandstrom, and J. H. Morris, "The Corona Plasma Cathode: A New Long-Life E-Beam Cathode for X-ray Preionization," Proc. IEEE, 4th Pulsed Power Conf. 1983, ed. T. K. Martin, M. F. Rose (N.Y. 1983). The e-beam anode was a "forward emitting" gold foil target at ground potential. When a high negative voltage pulse (accelerating potential) was applied to the wire coil on the cathode, the electric field between it and a grounded conductor inside the glass tube initiated a surface corona on the outside of the dielectric tube (electron source). Because no high DC voltages have to be sustained by the system, this type of gun can be made quite compact. This corona cathode has a more uniform emission than a carbon felt cathode and has a potential lifetime of more than $10^8$ pulses. Pulse rates as high as 200 Hz are possible with this gun, although cooling becomes a problem. The Helionetics gun has several severe drawbacks. One of these drawbacks is that the cathode is subject to catastrophic failure due to cracking or electric breakthrough of the highly stressed pyrex tube. Another drawback is that non-uniform erosion of the dielectric tube tends to make the electron emission less uniform as the tube ages. A further drawback is that the x-ray generator relies on the less efficient x-ray emission in the forward direction from a high-Z foil or coating on the x-ray window. Anode cooling becomes a problem at high pulse rates.

SUMMARY OF THE INVENTION

It is the principal object of the present invention to provide an x-ray preionizer that employs a rugged corona plasma cathode having all of the advantages of the HLX gun, but none of the severe limitations set forth above. This object is accomplished in accordance with the illustrated embodiments of the present invention by providing a gun of compact design that is contained in a 14 cm diameter cylinder. The gun employs a rugged cathode design in which the corona plasma is produced at the interface between a high-permittivity dielectric and a thick metal structure. Alternatively, the corona plasma is produced at the surface of an advanced ceramic/metal or ceramic/carbon composite. The cathode is not subject to failure, in contrast with the prior art HLX gun, since the dielectric is not used as an insulator to support high voltages. The life of the gun of the present invention is not limited by the cathode material. The cathode structure contains enough bulk for ablation to permit the generation of $10^{10}$ corona plasma pulses. A central liquid-cooled anode, suitable for high pulse rates, acts as the electron target, the x-rays being emitted in the more efficient "back direction." The x-ray emitter is a thick, high-Z metal coating, such as 100 microns of gold, thereby providing good thermal contact with the cooled anode structure. The emitter surface is shaped so as to preferentially direct or focus the x-rays toward the x-ray window. Moreover, the gun chamber does not require high vacuum levels. Background pressure may be as high as $5 \times 10^{-4}$ torr. No high DC voltages are employed, as the anode is driven to +90 kV in a 250 ns pulse, while a +10 kV pulse is applied to the cathode to generate the corona plasma. Finally, the anode and the cathode pulser circuits are switched by the same thyratron or thyristor, thereby requiring only one timed trigger pulse.

DETAILED DESCRIPTION OF THE INVENTION

Figure 1:
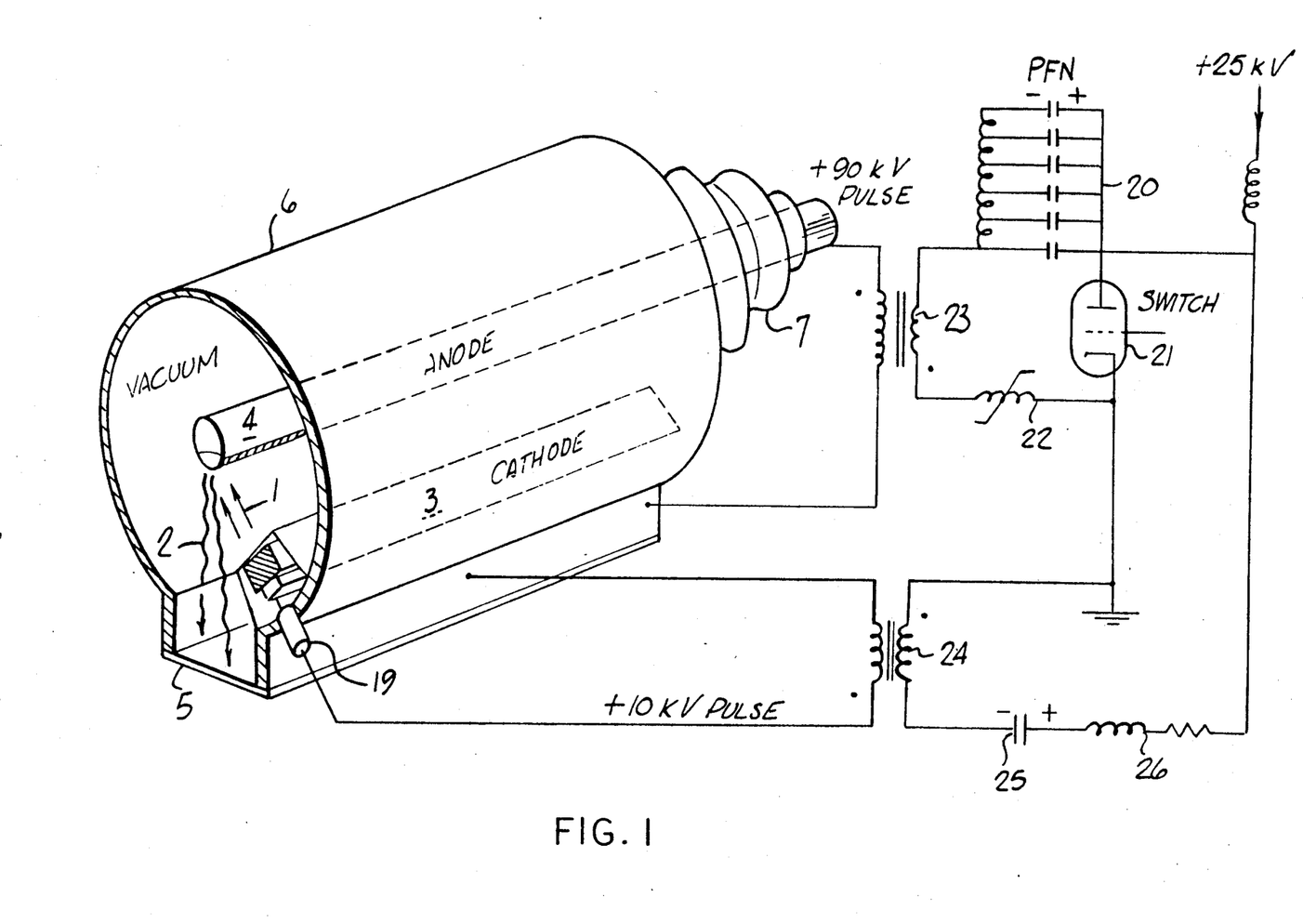
FIG. 1 is a general schematic diagram of a large-area x-ray generator and its excitation circuit constructed in accordance with the teachings of the present invention.

Referring now to FIG. 1, there is shown a large-area x-ray generator in which electrons 1 are generated at a cathode 3 and are accelerated to high energies in an electric field produced by pulsing an anode 4 to a high positive potential, typically 90 kV. At the anode 4 the electrons 1 strike a high-Z metal target which stops the electrons and converts some of their energy to x-rays in a typical energy range of 50 kV to 70 kV. The x-ray spectrum consists of a "Bremsstrahlung" continuum and x-ray lines which are characteristic of the target material. A large fraction of an emitted x-ray flux 2 is directed toward an x-ray window 5, constructed of a low-Z material such as aluminum, beryllium or thick plastic film such as poly-imide. When applied to preionize a gas laser, the x-rays pass through one or more of such windows into the laser discharge volume which needs to be uniformly preionized. Alternatively, the x-rays may be permitted to pass into any other material which one desires to irradiate.

The cathode 3 and anode 4 form what is generally known as an electron gun or e-gun. The electrodes of the electron gun are made somewhat longer than the region to be irradiated with x-rays to eliminate end effects. For gas laser preionization, the e-gun electrodes 3 and 4, and the window 5, should be matched to the size of the electric discharge electrodes of the laser, that is, to the shape of the discharge volume.

The e-gun electrodes 3 and 4 are enclosed in a cylindrical vacuum chamber 6, with the high-voltage electrode, anode 4, running along the center of the chamber. The evacuated gun chamber 6 is typically made of stainless steel or other metal and also serves to shield operating personnel from stray x-rays. The e-gun vacuum chamber 6 is at ground potential. The anode 4 is supported mechanically by a high-voltage insulator and feedthrough 7, which makes a vacuum seal with the vacuum chamber 6 and which permits the high-voltage anode pulse to be applied from an external pulse generator.

The anode pulse, used to accelerate electrons, and a cathode pulse, used to create the corona plasma which acts as the electron source, may be generated by an excitation circuit, such as the schematically depicted pulser circuit of FIG. 1. Typically 2-5 Joules of electrical energy are stored in a pulse forming network (PFN) 20, when it is charged to 25 kV from a conventional DC power supply, not illustrated. The PFN 20 comprises a series of capacitors and inductors configured in such a way as to produce a near-rectangular pulse of 200 ns to 300 ns duration. When one side of the PFN 20 is switched to ground by thyratron 21, or another fast high-voltage switch, a current pulse is passed through the primary winding of pulse transformer 23. Pulse transformer 23 is a 1:4 step-up transformer, which serves to step up the voltage from 25 kV to 90 kV for application to the anode 4 via feedthrough 7. Pulse transformer 23 also inverts the polarity of the negative PFN pulse to a positive anode pulse. The leakage inductance resulting from the leakage flux between primary and secondary windings of pulse transformer 23 must be kept as low as possible, so as not to degrade the shape of the anode pulse from a preferred voltage risetime of 100 ns or less. If switch 21 is a thyratron, its lifetime can be enhanced significantly by including a saturable inductor 22 in the PFN discharge circuit. This inductor, known as a "thyratron assist," delays the occurrence of high values of current rate-of-rise (dI/dt) until the thyratron has safely passed through its resistive turn-on phase.

The cathode pulse, required for corona formation, is produced simultaneously with the anode pulse by switching a small capacitor 25, containing less than 1 Joule of energy, to ground by means of the same thyratron switch 21. A second pulse transformer 24 may be employed to control the voltage and polarity of the pulse applied to the cathode structure via feedthrough 19. Several preferred geometries for this cathode structure are described in detail below. The duration and shape of the cathode pulse is modified by an L-R circuit 26 in such a way as to provide a high dV/dt across the cathode dielectric at the time when the anode voltage is at a maximum.

Figure 2:
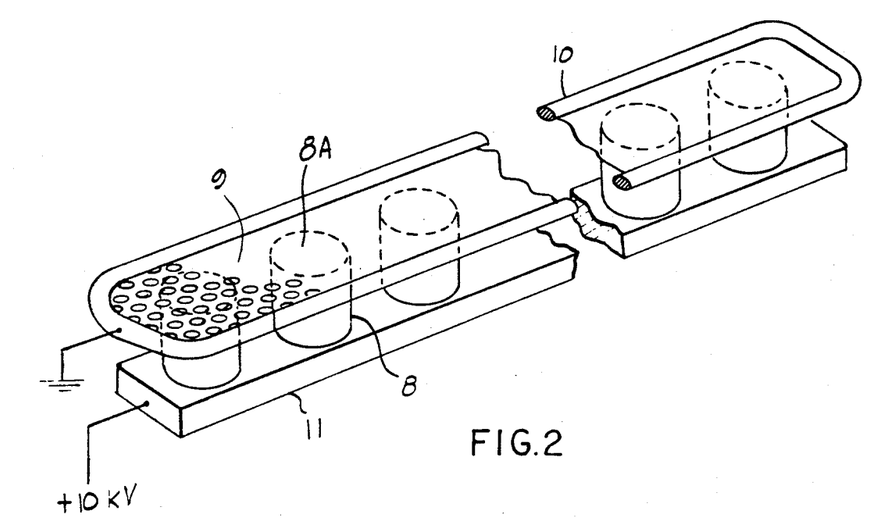
FIG. 2 is a diagram of one type of corona plasma cathode for use in the large-area x-ray generator of FIG. 1.
Figure 3:
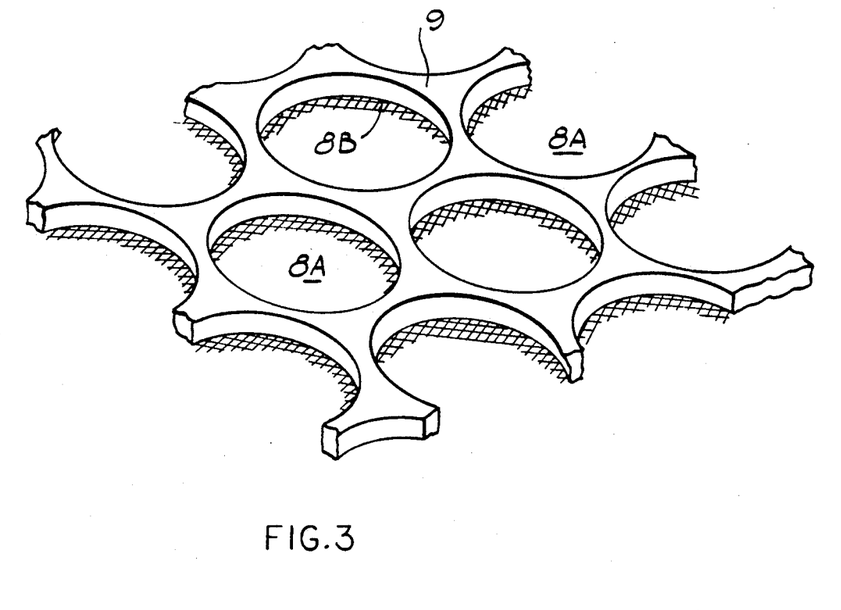
FIG. 3 is a diagram of a portion of a nickel screen employed in the corona plasma cathode of FIG. 2 illustrating areas of corona plasma formation.

Of utmost significance in the present invention are the construction and operating principle of the corona plasma cathode 3. A preferred design for plasma cathode 3 is illustrated in FIG. 2. In this embodiment, a high-permittivity dielectric 8 is sandwiched between a conductive bar 11 and a metal screen 9. In this case, the high-permittivity dielectric 8 consists of a series of bare barium-titanate or strontium-titanate discs, and the metal screen 9 comprises a 0.5 mm thick perforated nickel sheet. The nickel screen 9 is in intimate contact with one surface 8A of the dielectric material 8. The edge of nickel screen 9 is protected by a field-shaping metal bead 10. The assembly may be potted in a suitable plastic, such as alumina-filled epoxy, or ceramic, except for the top surface 8A of the dielectric 8 and nickel screen 9, which need to remain exposed. Nickel screen 9 and a field-shaping metal bead 10 are electrically grounded. When the cathode pulse of +10 kV is applied to conductive bar 11, a high electric field is created between surface 8A of dielectric 8 and nickel screen 9. This field is highest at the "triple junctions" where metal, ceramic, and vacuum meet, that is, around the edge of the perforations in the nickel screen 9. As a consequence of these high fields, a corona plasma 8B forms in these areas, as illustrated by the cross-hatching in FIG. 3.

Whereas the corona plasma may be initiated by field emission, the surface glow, or corona, is maintained by a number of electron emission processes. Positive ion bombardment and photo electric emission play an important part. The corona plasma, created from material desorbed and ablated from the surface of dielectric 8, rapidly spreads over the nickel screen 9 and provides a source of positive ions, which are pulled into the surface of nickel screen 9 to generate sufficient secondary electrons to maintain a space-charge limited electron beam (e-beam). A similar corona formation between dielectric 8 and conducting bar 11 should be avoided by metalizing the dielectric surface which is in contact with bar 11. Bar 11 should then be electrically connected to this metal film with conductive epoxy or by soldering.

Figure 4:
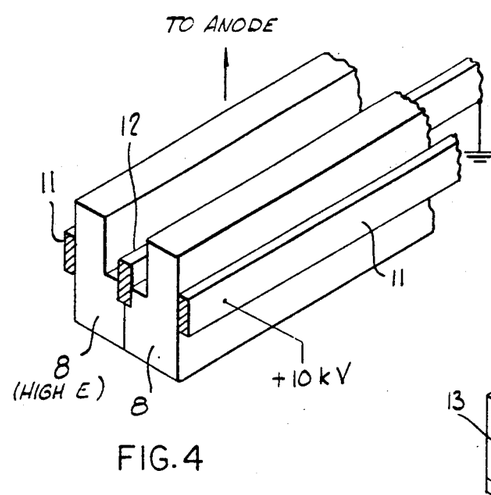
FIG. 4 is a diagram of a portion of a preferred cathode design in which the high permittivity dielectric comprises a continuous slab or bar.

The high-permittivity dielectric 8 may alternatively comprise a continuous slab or bar, as illustrated in FIG. 4. Here, the dielectric 8 is sandwiched between rugged metal bars 11 and 12. Bar 12 is the electrically grounded e-gun cathode. A corona plasma is produced on both sides of bar 12 by applying a positive 10 kV pulse to bars 11. The high-permittivity dielectric bars 8 are shaped so as to produce a high field at the "triple junctions" (both sides of bar 12), with the field being tangential to the surface of the dielectric, but normal to the metal surface.

Figure 5:
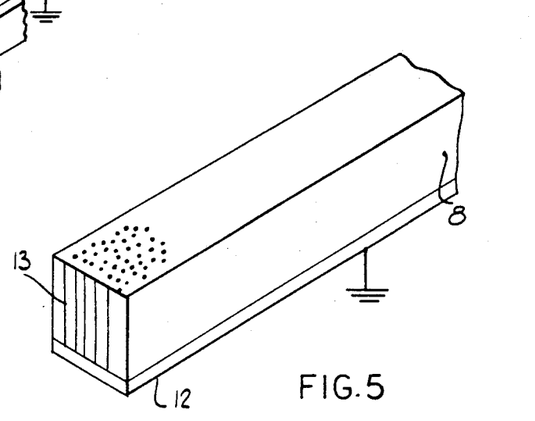
FIG. 5 is a diagram of a portion of an alternative cathode design employing a graphite fiber/ceramic composite with fibers running parallel through a high permittivity ceramic dielectric.
Figure 6:
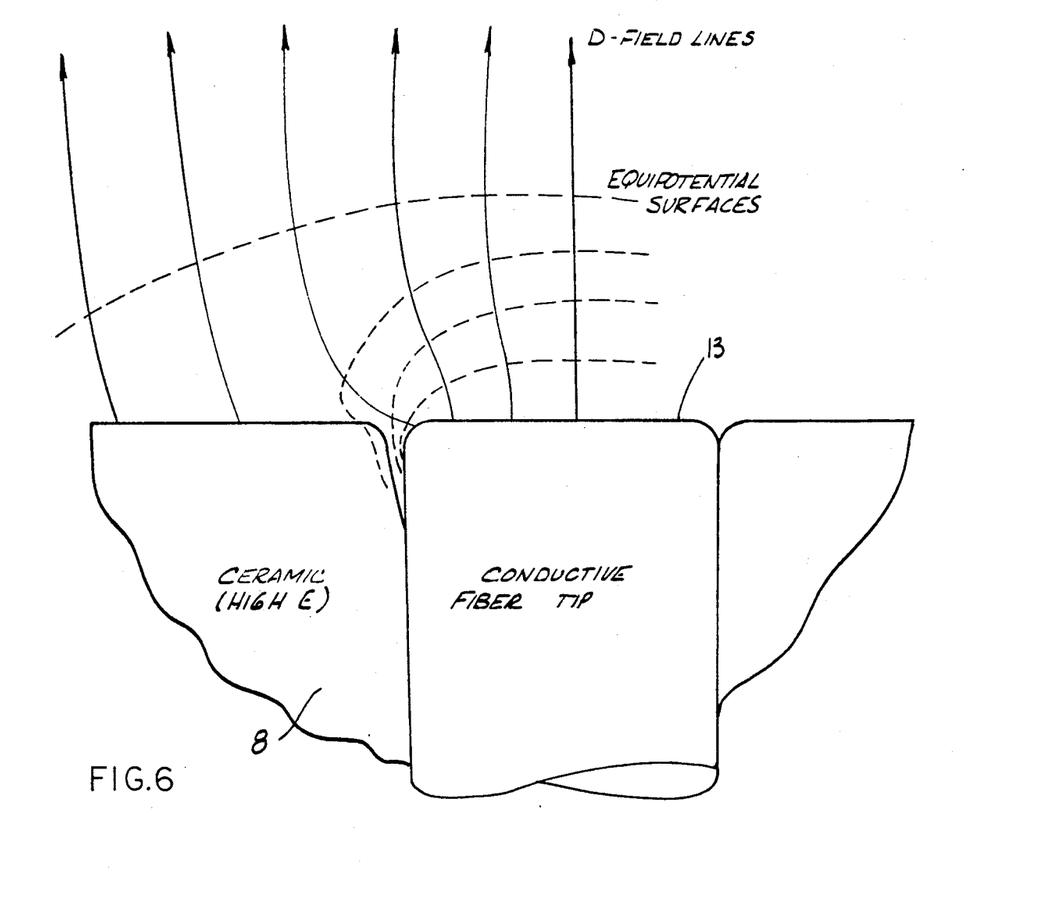
FIG. 6 is a diagram illustrating the details of the electric field that exists at the tip of each conductive fiber embedded in the ceramic dielectric shown in FIG. 5.

The well known fact that graphite felt cathodes work as cold "field" emitters when dirty, but do not work well when clean, seems to indicate that the observed emission is not field emission from the fiber tips but is due to field/corona effects at the interface between carbon strands and dielectric "dirt" particles. Building on this hypothesis, another alternative cathode design may be provided, as illustrated in FIG. 5. This cathode comprises a graphite fiber/ceramic composite, with the fibers 13 running parallel through the high-permittivity ceramic. The exposed fiber ends at one face of the composite slab 8 are in electrical contact with a grounded metal bar 12. The exposed fiber ends at the opposite face form the emitter surface, or actual cathode. As shown in FIG. 6, the electric field at the triple junctions (carbon/ceramic/vacuum) around the fiber tips may be sufficiently large to initiate surface corona formation. This type of corona cathode does not require an auxiliary cathode pulse, and is therefore a simplification over the cathodes discussed above. In order to maximize the field at the fiber tips, the distance between fibers should be made larger than the diameter of the fibers.

It is important to note that with any of the corona cathodes discussed herein, a crack or break in the dielectric ceramic does not lead to failure of the electric gun. In fact, the ceramic can be formed of individual blocks, as illustrated in FIG. 2, rather than as a continuous bar.

Figure 7:
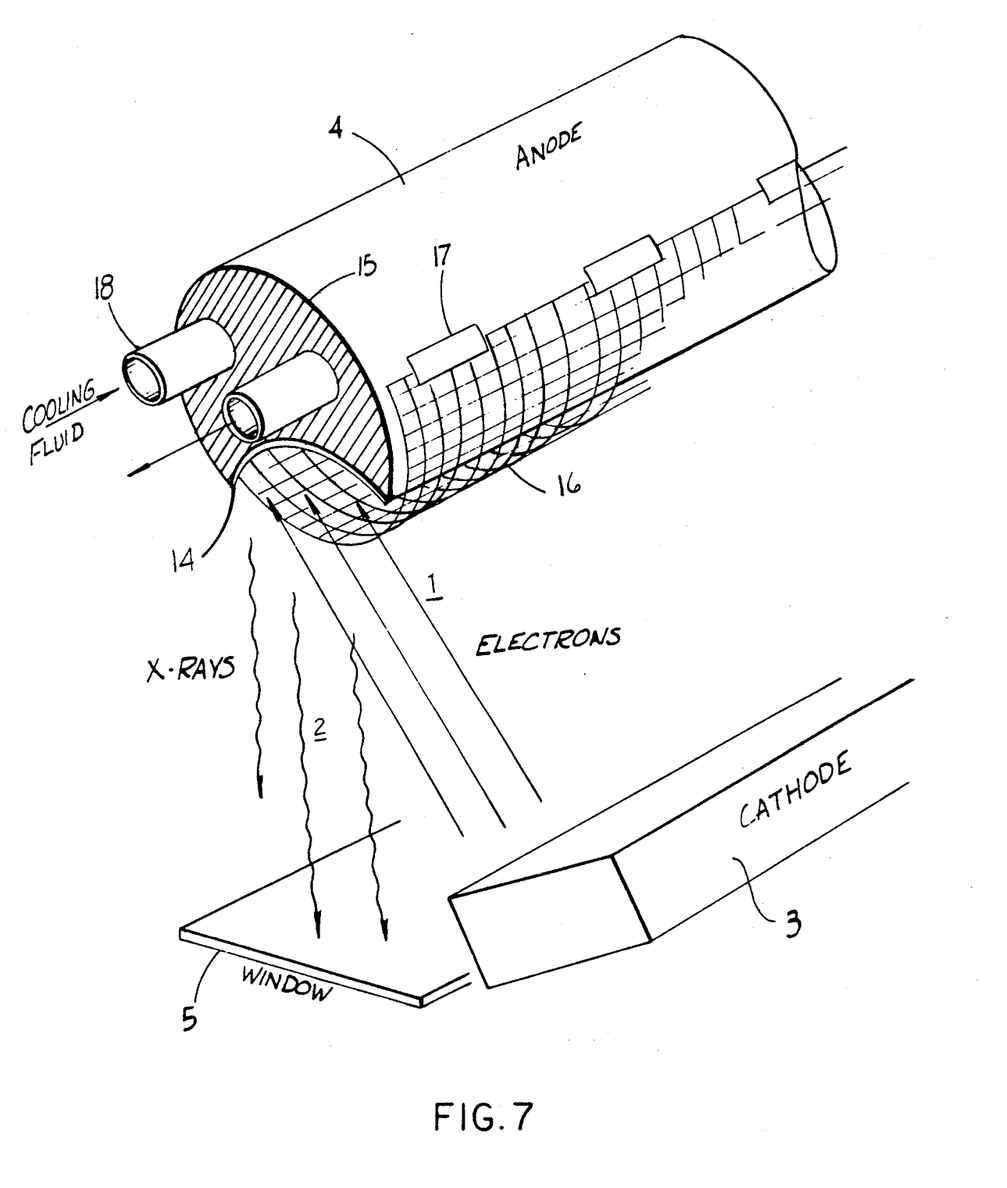
FIG. 7 is a diagram of an anode for use in the large-area x-ray generator of FIG. 1.

Another important component of the electron gun of this invention is the anode 4, a detailed illustration of which is contained in FIG. 7. Anode 4 comprises a copper or brass cylinder, having high thermal conductivity. Anode 4 is located near the center of the electron gun vacuum chamber 6 of FIG. 1, so that the electric field produced by the anode pulse focuses the electrons 1 onto the anode 4. Cooling ducts or tubes 18 are provided for removing heat from the anode 4 by means of a suitable cooling liquid such as deionized water, oil or freon. An electron target area 14 is covered with a high-Z metal film, such as gold, for efficient x-ray production. X-rays 2 are emitted in a flat cosine distribution, resulting in a widely diverging x-ray flux, if the target area 14 is flat. A fair degree of collimation can be achieved by making the target surface 14 concave, as illustrated in FIG. 7. The exact shape and orientation of this concave target surface is chosen so as to focus the x-rays onto the x-ray window 5.

In order that the accelerating field not be disturbed by the concave target surface, a wire screen 16 is wrapped around the cylindrical anode 4. Wire screen 16 is made of a thin refractory metal wire, such as tungsten, and has a transmission of better than 80 percent for the electrons 1 accelerated toward the anode 4. Wire screen 16 is electrically connected to the main body of the anode 4 by metal clips 17, or it may be soldered or screwed to the anode 4.

Figure 8:
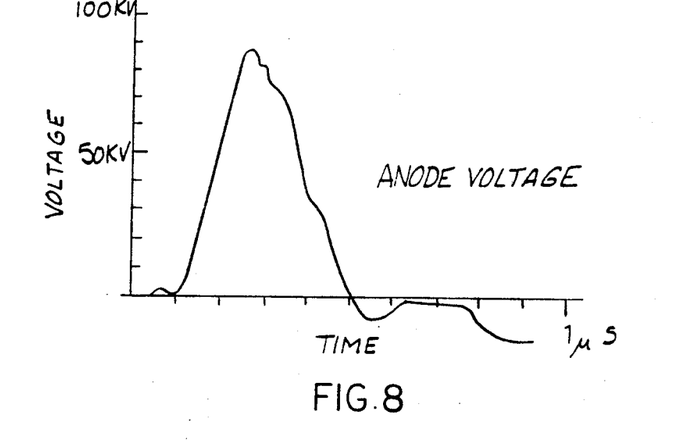
FIG. 8 is a waveform diagram illustrating a typical waveform of anode voltage versus time for the large-area x-ray generator of FIG. 1.

Temporal pulse shapes measured during operation of a prototype x-ray generator, constructed as described hereinabove, are reproduced in FIGS. 8-10. The corona cathode design was as shown in FIG. 2. Electrode length was 75 cm, and anode-cathode spacing was 5 cm. Voltages and currents were measured with a compensated high-voltage probe and with a current transformer placed around the conductor leading to the anode or cathode. The anode voltage, as generated by the pulser described in FIG. 1, is seen in FIG. 8 to reach a peak of 90 kilovolts. The pulse is approximately 250 nonoseconds wide.

Figure 9:
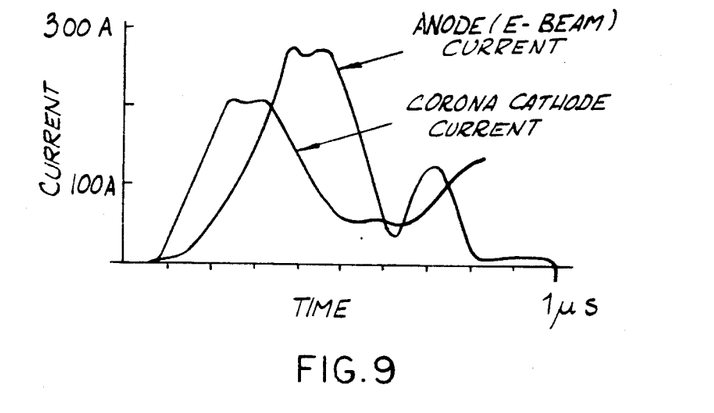
FIG. 9 is a waveform diagram illustrating typical waveforms of anode (e-beam) current and corona cathode current versus time for the large-area x-ray generator of FIG. 1.
Figure 10:
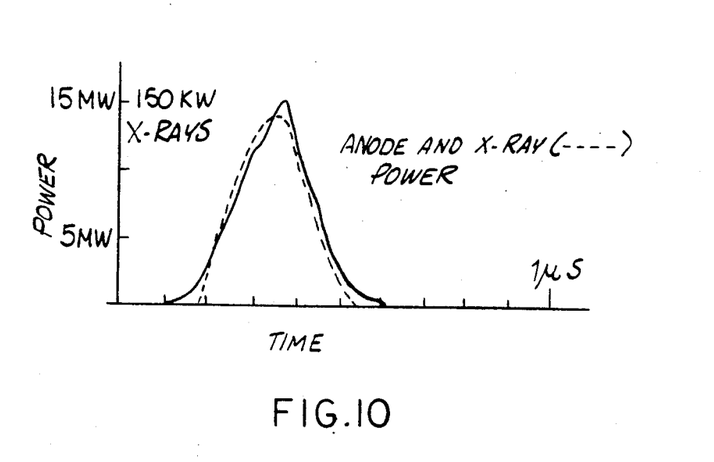
FIG. 10 is a waveform diagram illustrating typical waveforms for anode and x-ray power versus time for the large-area x-ray generator of FIG. 1.

Typical anode current and cathode current pulses are shown in FIG. 9. The measured anode current corresponds to the actual e-beam current. With an amplitude of 300 amperes, corresponding to a current density of over 2 A/cm$^2$, the e-beam is clearly operating in the space-charge-limited regime.

The power deposited onto the e-beam target (anode power) has been calculated by multiplying the measured anode voltage from FIG. 8 with the measured anode current from FIG. 9. The product curve is depicted in FIG. 10. Peak anode power reaches 15 megawatts here. The power in the x-ray pulse is taken to be 1% of anode power, a typical conversion efficiency for generating x-rays. The shape of the x-ray power pulse is very similar to the anode power pulse, except that the x-ray pulse, illustrated by the dashed curve of FIG. 10, is somewhat narrower.

I claim:

1. A cold cathode x-ray generator comprising:
   a generally cylindrical vacuum chamber having a window region through which x-rays generated within the vacuum chamber are transmitted;
   anode means positioned within the vacuum chamber, said anode means having a target surface for focusing x-rays onto the window region;
   corona plasma cathode means positioned within the vacuum chamber, said corona plasma cathode means being spaced apart from said anode means and being generally coextensive therewith, said corona plasma cathode means comprising an elongate conductive metal bar, a flat perforated metal screen having a metal bead around the periphery thereof and being positioned in spaced apart parallel relationship with said elongate conductive metal bar and generally coextensive therewith, and a high permittivity dielectric material sandwiched between said elongate conductive metal bar and said flat perforated metal screen, said flat perforated metal screen comprising nickel and said high permittivity dielectric material comprising a plurality of spaced apart discs sandwiched between said elongate conductive metal bar and said flat perforated metal screen; and
   pulse generating means for simultaneously applying high voltage pulses to said anode means and said corona plasma cathode means, whereby, in response to application of said high voltage pulses, a corona plasma is created over a surface of said flat perforated metal screen to provide a source of ions for generating an electron beam that strikes the target surface of said anode means, thereby producing x-rays that are focused onto said window region.

2. A cold cathode x-ray generator as in claim 1 wherein said plurality of discs comprise barium titanate.

3. A cold cathode x-ray generator as in claim 1 wherein said plurality of discs comprise strontium titanate.

4. A cold cathode x-ray generator as in claim 1 wherein said plurality of discs comprise titanium oxide.

5. A cold cathode x-ray generator comprising:
   a generally cylindrical vacuum chamber having a window region through which x-rays generated within the vacuum chamber are transmitted;
   anode means positioned within the vacuum chamber, said anode means having a target surface for focusing x-rays onto the window region;
   corona plasma cathode means positioned within the vacuum chamber, said corona plasma cathode means being spaced apart from said anode means and being generally coextensive therewith, said corona plasma cathode means comprising an elongate conductive metal bar, a flat perforated metal screen in spaced apart parallel relationship with said elongate conductive metal bar and generally coextensive therewith, and a high permittivity dielectric material sandwiched between said elongate conductive metal bar and said flat perforated metal screen; and
   pulse generating means for simultaneously applying high voltage pulses to said anode means and said corona plasma cathode means, whereby, in response to application of said high voltage pulses, a corona plasma is created over a surface of said flat perforated metal screen to provide a source of ions for generating an electron beam that strikes the target surface of said anode means, thereby producing x-rays that are focused onto said window region;
   said anode means comprising a generally solid cylindrical bar having a concave notch in a portion of a cylindrical surface thereof;
   said concave notch defining said target surface for focusing x-rays onto said window region;
   said target surface being plated with a heavy metal; and
   at least a portion of the cylindrical surface of said generally solid cylindrical bar being wrapped with a wire screen, said wire screen being electrically connected to said generally solid cylindrical bar.

6. A cold cathode x-ray generator as in claim 5, wherein said generally solid cylindrical bar comprises a metal having a high thermal conductivity.

7. A cold cathode x-ray generator as in claim 6, wherein said generally solid cylindrical bar includes coolant means imbedded therein for circulating a coolant material.

8. A cold cathode x-ray generator as in claim 7, wherein said heavy metal comprises gold.

9. A cold cathode x-ray generator as in claim 8, wherein said wire screen comprises a refractory metal.

10. A cold cathode x-ray generator as in claim 9, wherein said refractory metal comprises tungsten.

11. A cold cathode x-ray generator comprising:
    a generally cylindrical vacuum chamber having a window region through which x-rays generated within the vacuum chamber are transmitted;

anode means positioned within the vacuum chamber, said anode means having a target surface for focusing x-rays onto the window region;

corona plasma cathode means positioned within the vacuum chamber, said corona plasma cathode means being spaced apart from said anode means and being generally coextensive therewith, said corona plasma cathode means comprising an elongate conductive metal ar and an elongate composite bar coextensive with said elongate conductive metal bar, said elongate composite bar comprising a high permittivity ceramic material having a plurality of parallel graphite fibers imbedded therein, opposite ends of each imbedded graphite fiber terminating on opposite surfaces of said elongate composite bar, one of said opposite surfaces being in intimate physical contact with said elongate conductive metal bar such that said plurality of parallel graphite fibers is in electrical contact with said elongate conductive metal bar; and pulse generating means for applying a high voltage pulse to said anode means, whereby, in response to application of said high voltage pulse, a corona plasma is created over the one of said opposite surfaces of said elongate composite bar not in intimate physical contact with said elongate conductive metal bar to provide a source of ions for generating an electron beam that strikes the target surface of said anode means, thereby producing x-rays that are focused onto said window region;

said anode means comprising a generally solid cylindrical bar having a concave notch in a portion of a cylindrical surface thereof;

said concave notch defining said target surface for focusing x-rays onto said window region;

said target surface being plated with a heavy metal; and at least a portion of the cylindrical surface of said generally solid cylindrical bar being wrapped with a wire screen, said wire screen being electrically connected to said generally solid cylindrical bar.

12. A cold cathode x-ray generator as in claim 11, wherein said generally solid cylindrical bar comprises a metal having a high thermal conductivity.

13. A cold cathode x-ray generator as in claim 12, wherein said generally solid cylindrical bar includes coolant means imbedded therein for circulating a coolant material.

14. A cold cathode x-ray generator as in claim 13, wherein said heavy metal comprises gold.

15. A cold cathode x-ray generator as in claim 14, wherein said wire screen comprises a refractory metal.

16. A cold cathode x-ray generator as in claim 15, wherein said refractory metal comprises tungsten.

17. A cold cathode x-ray generator comprising:

a generally cylindrical vacuum chamber having a window region through which x-rays generated within the vacuum chamber are transmitted;

anode means positioned within the vacuum chamber, said anode means having a target surface for focusing x-rays onto the window region;

corona plasma cathode means positioned within the vacuum chamber, said corona plasma cathode means being spaced apart from said anode means and being generally coextensive therewith, said corona plasma cathode means comprising first and second elongate conductive metal bars in spaced apart parallel relationship to each other, a third elongate conductive metal bar positioned between said first and second elongate conductive metal bars and parallel thereto, and a high permittivity dielectric material sandwiched between said first and second elongate conductive metal bars and retaining said third elongate metal bar; and pulse generating means for simultaneously applying high voltage pulses to said anode means and said corona plasma cathode means, whereby, in response to application of said high voltage pulses, a corona plasma is created adjacent said third elongate conductive metal bar to provide a source of ions for generating an electron beam that strikes the target surface of said anode means, thereby producing x-rays that are focused onto said window region;

said anode means comprising a generally solid cylindrical bar having a concave notch in a portion of a cylindrical surface thereof;

said concave notch defining said target surface for focusing x-rays onto said window region;

said target surface being plated with a heavy metal; and at least a portion of the cylindrical surface of said generally solid cylindrical bar being wrapped with a wire screen, said wire screen being electrically connected to said generally solid cylindrical bar.

18. A cold cathode x-ray generator as in claim 17, wherein said generally solid cylindrical bar comprises a metal having a high thermal conductivity.

19. A cold cathode x-ray generator as in claim 18, wherein said generally solid cylindrical bar includes coolant means imbedded therein for circulating a coolant material.

20. A cold cathode x-ray generator as in claim 19, wherein said heavy metal comprises gold.

21. A cold cathode x-ray generator as in claim 20, wherein said wire screen comprises a refractory metal.

22. A cold cathode x-ray generator as in claim 21, wherein said refractory metal comprises tungsten.

* * * * *